US011161696B2

(12) United States Patent
Sebastian et al.

(10) Patent No.: US 11,161,696 B2
(45) Date of Patent: Nov. 2, 2021

(54) OBJECT STOP FOR AUTOMATED OBJECT CONVEYING SYSTEMS

(71) Applicant: INTELLIGRATED HEADQUARTERS, LLC, Mason, OH (US)

(72) Inventors: Jarl Nicholas Sebastian, Trenton, OH (US); Anthony J. Turco, Liberty Township, OH (US); Jacob D. Wieneke, Liberty Township, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 16/752,980

(22) Filed: Jan. 27, 2020

(65) Prior Publication Data

US 2021/0229933 A1    Jul. 29, 2021

(51) Int. Cl.
*B65G 47/88*    (2006.01)
*B65G 47/82*    (2006.01)
*B65G 25/10*    (2006.01)
*B65G 21/02*    (2006.01)
*B65G 13/00*    (2006.01)

(52) U.S. Cl.
CPC ......... *B65G 47/8838* (2013.01); *B65G 25/10* (2013.01); *B65G 47/82* (2013.01); *B65G 13/00* (2013.01); *B65G 21/02* (2013.01); *B65G 2201/025* (2013.01); *B65G 2201/0285* (2013.01); *B65G 2203/0233* (2013.01)

(58) Field of Classification Search
CPC .... B65G 25/10; B65G 25/12; B65G 47/8838; B65G 47/82; B65B 35/20
See application file for complete search history.

(56) References Cited

U.S. PATENT DOCUMENTS

| 5,671,837 | A  | * | 9/1997 | Tazou   | B21D 43/20 198/369.2 |
| 6,202,827 | B1 | * | 3/2001 | Drewitz | B65G 47/082 198/433 |
| 8,956,099 | B2 |   | 2/2015 | Olszak et al. | |
| 9,409,709 | B2 |   | 8/2016 | Keating et al. | |

FOREIGN PATENT DOCUMENTS

| CN | 203064609 U |   | 7/2013  |            |
|----|-------------|---|---------|------------|
| GB | 2079711 B   | * | 2/1984  | B65G 25/10 |
| GB | 2471298 B   | * | 12/2013 | B65G 47/82 |

* cited by examiner

*Primary Examiner* — William R Harp
(74) *Attorney, Agent, or Firm* — Alston & Bird LLP (57) ABSTRACT

An object redirection mechanism for a conveying system is provided. The object redirection mechanism is configured to redirect an object moved by the conveying system from a first direction to a second direction. The object redirection mechanism includes an arm tunnel positioned proximate an end of a conveyor configured for moving an object in the first direction. The arm tunnel includes an object stop having an object stopping portion defining at least a first side of the arm tunnel at least substantially parallel with the second direction and configured to engage an object moving in the first direction. The object stopping portion defines at least one finger aperture to enable at least one of the rotationally-retractable fingers to, when aligned with the at least one finger aperture, rotate between a retracted configuration and an extended configuration. A corresponding object conveying system and method of assembling an object stop are provided.

20 Claims, 7 Drawing Sheets

OBJECT STOP FOR AUTOMATED OBJECT CONVEYING SYSTEMS

TECHNOLOGICAL FIELD

Example embodiments of the present disclosure relate generally to automated conveying mechanisms, and more particularly, to moving of objects along conveyors during operation.

BACKGROUND

Arm mechanisms are often used to move objects laterally in a perpendicular direction to a conveyor (or other conveying mechanism, such as powered rollers, and/or the like), such as to move objects from a first conveyor onto a second conveyor; to move objects from a conveyor into a storage location; and/or the like. However, current arm mechanisms may be incapable of efficiently and consistently moving objects of varying sizes. While certain conveying mechanisms are configured specifically for moving large objects (e.g., large boxes), these same conveying mechanisms may be incapable of consistently moving smaller, irregular objects (e.g., padded mailers). Applicant has identified several technical challenges associated with automated conveying mechanisms. Through applied effort, ingenuity, and innovation, many of these identified challenges have been overcome by developing solutions that are included in embodiments of the present disclosure, many examples of which are described in detail herein.

BRIEF SUMMARY

The illustrative embodiments of the present disclosure relate to object conveying systems and object stops for object conveying systems. In an example embodiment, an object redirection mechanism is provided for a conveying system. The object redirection mechanism is configured to redirect an object moved by the conveying system from a first direction to a second direction. The object redirection mechanism includes an arm tunnel positioned proximate an end of a conveyor configured for moving an object in the first direction. An interior of the arm tunnel defines a protected linear travel path parallel to the second direction for an extendable arm having rotationally-retractable fingers to separate the extendable arm from objects moving in the first direction. The arm tunnel includes an object stop having an object stopping portion defining at least a first side of the arm tunnel at least substantially parallel with the second direction and configured to engage an object moving in the first direction. The object stopping portion defines at least one finger aperture to enable at least one of the rotationally-retractable fingers to, when aligned with the at least one finger aperture, rotate between a retracted configuration and an extended configuration. The retracted configuration is an instance in which the at least one finger is at least partially aligned with the extendable arm such that the at least one finger is aligned for travel within the interior of the arm tunnel. The extended configuration is an instance in which the at least one finger extends from the extendable arm and beyond the object stopping portion to engage an object engaged with the object stopping portion. A bottom edge of the object stopping portion is spaced above a top surface of the conveyor to enable the at least one finger to pass under the bottom edge of the object stopping portion when in the extended configuration to engage an object and move the object in the second direction.

In some embodiments, the object stopping portion defines a receiving portion. In such an embodiment, the receiving portion defines a planar surface along the first side of the arm tunnel and the receiving portion is configured to engage with one or more objects travelling in the first direction. In some embodiments, the receiving portion further includes a planar surface above at least one of the at least one finger aperture. In some embodiments, the object stopping portion defines two finger apertures defined on opposite edges of the object stopping portion.

In some embodiments, the object stop also includes an attachment portion. In such an embodiment, the attachment portion is configured to attach the object stop to the object conveyor system. In some embodiments, the object stopping portion and the attachment portion are formed via a bending process. In some embodiments, the attachment portion defines one or more attachment apertures configured to attach the object stop to the automated object conveying system. In some embodiments, the object redirection mechanism also includes an extendable arm. In such an embodiment, the at least one finger is rotationally attached at a bottom edge of the arm. In some embodiments, the height of the finger apertures is greater than a length of the finger.

In another example embodiment, an object conveying system with object stop is provided. The object conveying system includes a conveyor for moving an object in a first direction. The object conveying system also includes an extendable arm configured to move along with an object in a second direction during operations. The object conveying system further includes one or more fingers operably coupled with the arm mechanism, such that the one or more fingers are controlled via the arm mechanism. The one or more fingers are configured to engage and provide a moving force on the object. The object conveying system still further includes an arm tunnel positioned proximate an end of a conveyor configured for moving an object in the first direction. An interior of the arm tunnel defines a protected linear travel path parallel to the second direction for the extendable arm having rotationally-retractable fingers to separate the extendable arm from objects moving in the first direction. The arm tunnel includes an object stop having an object stopping portion defining at least a first side of the arm tunnel at least substantially parallel with the second direction and configured to engage an object moving in the first direction. The object stopping portion defines at least one finger aperture to enable at least one of the rotationally-retractable fingers to, when aligned with the at least one finger aperture, rotate between a retracted configuration and an extended configuration. The retracted configuration is an instance in which the at least one finger is at least partially aligned with the extendable arm such that the at least one finger is aligned for travel within the interior of the arm tunnel. The extended configuration is an instance in which the at least one finger extends from the extendable arm and beyond the object stopping portion to engage an object engaged with the object stopping portion. A bottom edge of the object stopping portion is spaced above a top surface of the conveyor to enable the at least one finger to pass under the bottom edge of the object stopping portion when in the extended configuration to engage an object and move the object in the second direction.

In some embodiments, the object stopping portion of the object stop defines a receiving portion. In such an embodiment, the receiving portion defines a planar surface along the first side of the arm tunnel and the receiving portion is configured to engage with one or more objects travelling in the first direction. In some embodiments, the receiving portion further includes a planar surface above at least one of the at least one finger aperture. In some embodiments, the object stopping portion defines two finger apertures defined on opposite edges of the object stopping portion.

In some embodiments, the object stop further includes an attachment portion. In such embodiments, the attachment portion is configured to attach the object stop to the automated object conveying system. In some embodiments, the object stopping portion and the attachment portion are formed via a bending process. In some embodiments, the attachment portion defines one or more attachment apertures configured to attach the object stop to the automated object conveying system. In some embodiments, the object redirection mechanism also includes an extendable arm. In such an embodiment, the at least one finger is rotationally attached at a bottom edge of the arm. In some embodiments, the height of the finger apertures have a height greater than a length of the finger. In some embodiments, the object redirection mechanism also includes a second conveyor. In such an embodiment, the object redirection mechanism is configured to move the object onto the second conveyor. In some embodiments, the object redirection mechanism is configured to move the object into a container.

In still another example embodiment, a method of manufacturing an object stop is provided. The method includes cutting out an object stop configured with an attachment portion and an object stopping portion. The method also includes providing one or more finger apertures along the object stopping portion. The method further includes providing one or more attachment apertures along the attachment portion. The method still further includes bending the object stop such that the attachment portion and the object stopping portion may be generally perpendicular.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various example embodiments described herein such that embodiments may include fewer or more components than those shown in the figures while not departing from the scope of the disclosure.

Turning now to the drawings, the detailed description set forth below in connection with the appended drawings is intended as a description of various example configurations and is not intended to represent the only configurations in which the concepts described herein may be practiced. The detailed description includes specific details for the purpose of providing a thorough understanding of various concepts with like numerals denoting like components throughout the several views. However, it will be apparent to those skilled in the art of the present disclosure that these concepts may be practiced without these specific details.

Automated sorting and retrieval systems (ASRS) and other object conveying systems are used to move objects of various sizes from one place to another, such as from an intake to one or more identified sort locations. These systems often incorporate conveyors (e.g., planar conveyor belts, powered or unpowered rollers, and/or the like) to move objects while minimizing the likelihood of damage to the objects. In certain implementations, object conveying systems (e.g., ASRS mechanisms) additionally employ mechanisms for moving objects perpendicular to the conveyors, for example, to move objects from a first conveying mechanism to a second conveying mechanism, to move objects from a conveying mechanism into a sort location, and/or the like. These mechanisms may incorporate one or more arm mechanisms to change the direction of the object from travelling with the conveyor. For example, the arm mechanism may extend away from a housing via a drive mechanism, while in some instances a base end of the arm mechanism remains secured to the housing. The opposite, distal end of the arm mechanism incorporates a rotationally attached finger configured to rotate between a closed configuration in which the finger is at least substantially planar with a surface of the arm mechanism, and an open configuration in which the finger is rotated away from the surface of the arm mechanism so as to be disposed at least substantially perpendicular to the surface of the arm mechanism. As such, the arm mechanism with one or more fingers may be used to engage a surface of an object and to redirect objects (e.g., laterally or perpendicular to a travel direction of the objects along the conveyor) during operation. In certain conveying system configurations, these arm mechanisms are positioned at an end of the conveyors, such that objects naturally stop proximate the end of the conveyor, where the arm mechanism extends (e.g., perpendicular to the direction of travel of the object) to engage the object, and the one or more fingers interact with the object while the arm mechanism retracts so as to move the object away from the end of the conveyor. Current object conveying system configurations provide insufficient object stopping capabilities, especially for stopping low profile objects from overshooting an end of the conveyor during operation. Various embodiments of the present disclosure provide a tunnel for the arm mechanism to be disposed that also allows for the fingers attached to the arm mechanism to extend and retract from within the tunnel.

Figure 1:
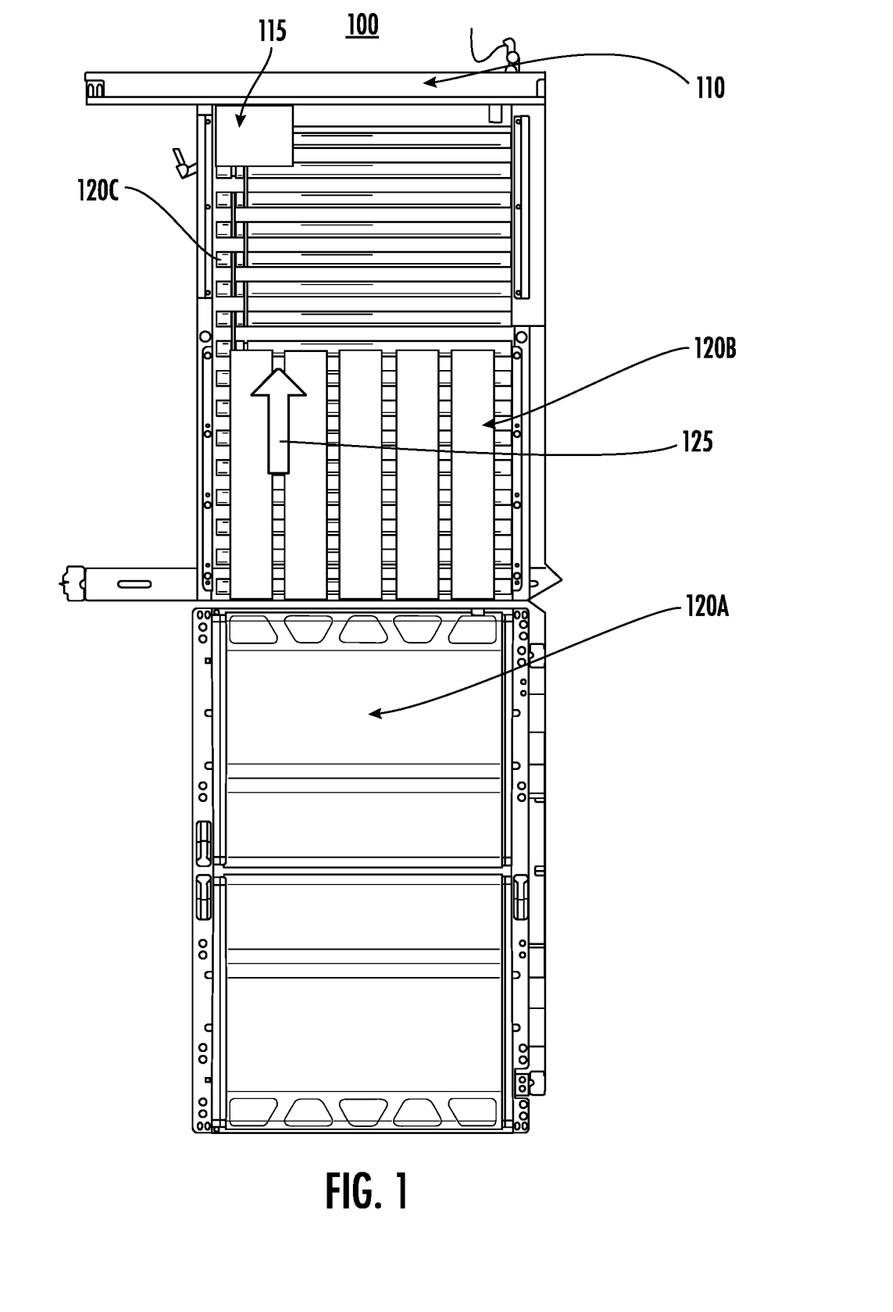
FIG. 1 illustrates a top view of an automated object conveying system incorporating an object stop in accordance with an example embodiment of the present disclosure.

FIG. 1 illustrates a top view of an object conveying system (e.g., a portion of an ASRS) configured with an object redirection mechanism of the present disclosure. As shown, the object conveying system 100 may include one or more sets of conveyors (e.g., conveyors 120A-120C, including powered conveyor belt configurations and rollers) configured to carry various sized objects 115 (e.g., boxes, parcels, tubs, totes, padded mailers, and/or the like) in a first direction 125, from a conveyor intake to a distal end of the one or more sets of conveyors. In various embodiments, the object conveying system 100 employs the object redirection mechanism at the distal end of the conveyors configured to move objects in a second direction that may be generally perpendicular to the first direction 125. In various embodiments, the object redirection mechanism may include an arm tunnel (shown in FIG. 3) proximate to the distal end of the conveyor 120C. In various embodiments, the interior of the arm tunnel defines a protected linear travel path parallel to the second direction for an extendable arm mechanism (e.g., the arm mechanism 210 shown in FIGS. 2 and 3). In various embodiments, the arm tunnel may include an object stop 110. In various embodiments, the object stop 110 may define at least a first side of the arm tunnel and the first side may be at least substantially parallel with the second direction. As discussed herein, the object stop 110 may be configured to engage an object moving in the first direction (e.g., travelling along the conveyor 120C). In various embodiments, the object redirection mechanism may be configured to redirect an object 115 along the second direction towards another portion of an ASRS, to another conveyor, to a container, to a specific sort location, and/or the like.

Figure 2:
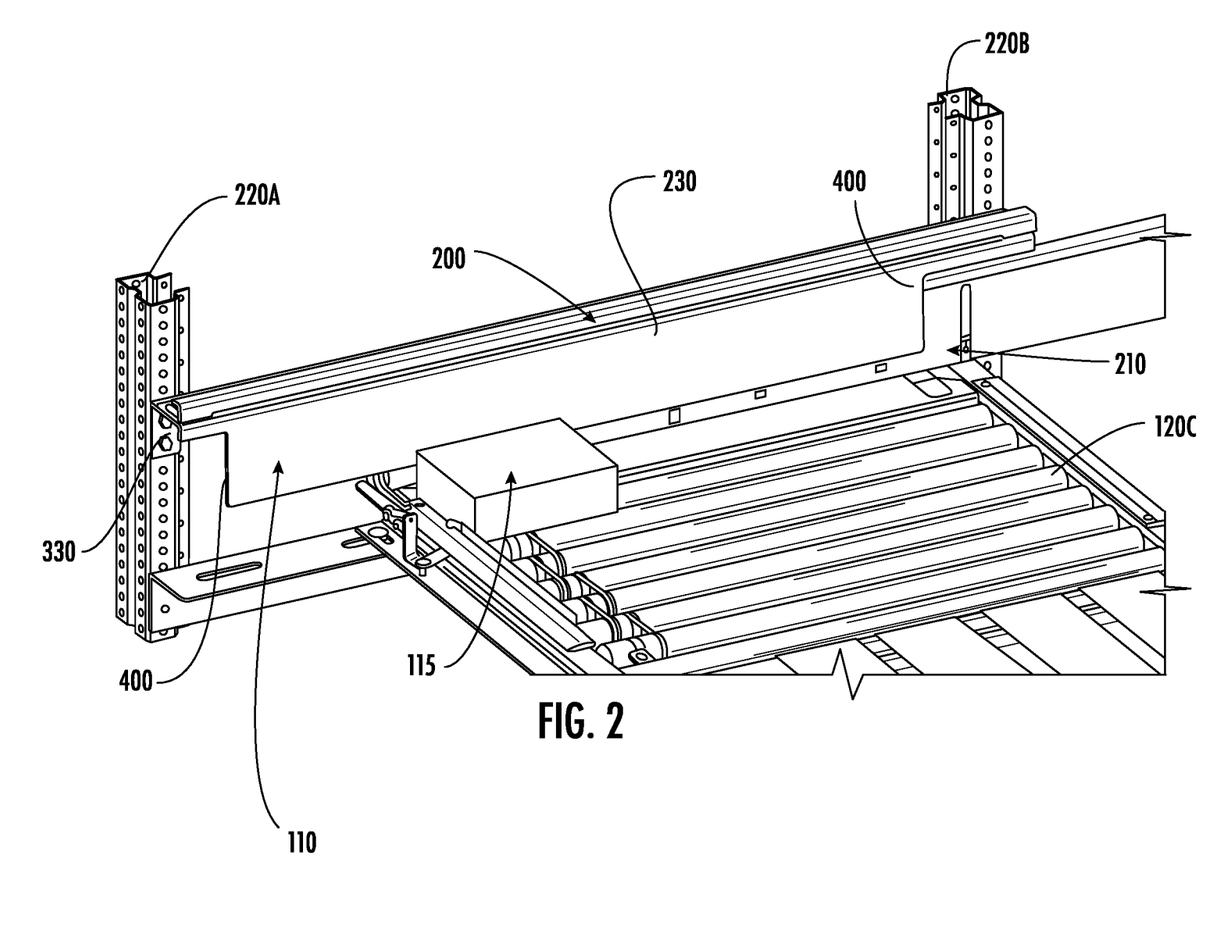
FIG. 2 illustrates an additional view of the automated object conveying system incorporating the object stop in accordance with an example embodiment of the present disclosure.

As shown in FIG. 2, the arm mechanism 210 may be disposed at the distal end of the conveyor 120C within the arm tunnel, as discussed in reference to FIG. 3 below). In some embodiments, the object conveying system 100 may have a frame configured with frame posts (or other supports) (e.g., frame posts 220A, 220B). In some embodiments, a cross bar 200 may be configured to attached via one or more mountings (e.g., cross bar mount 330) to each of frame post 220A and frame post 220B. In various embodiments, the cross bar 200 may be relatively parallel to the surface of the conveyor 120C and, as such, defines a cross bar height between the surface of the conveyor 120C and the cross bar 200. In various embodiments, the cross bar 200 may provide some protection from objects overshooting an end of the conveyor 120C in an instance in which the object 115 is a sufficient height, such as a height greater than the cross bar height (specifically, greater than the distance between the conveying surface and a bottom edge of the cross bar). However, the cross bar 200 does not provide sufficient protection from low-profile objects overshooting an end of the conveyor 120C, as objects that have a height less than the cross bar height do not engage the cross bar 200. In various embodiments, the object stop 110 may be provided to create the arm tunnel between the conveyor 120C and the arm mechanism 210. In various embodiments, the arm mechanism 210 may be disposed in a protected linear travel path parallel to the second direction in order to separate the extendable arm mechanism 210 from objects 115 moving in the first direction. As discussed below in reference to FIG. 3, the object stop 110 also allows for fingers of the arm mechanism 210 to extend and retract (e.g., rotate) during operation without interference through one or more finger apertures. In various embodiments, in an instance in which an object 115 is travelling in the first direction 125 towards the arm mechanism 210, the object 115 may engage the object stop 110, which impedes further movement of the object 115 in the first direction.

Figure 3:
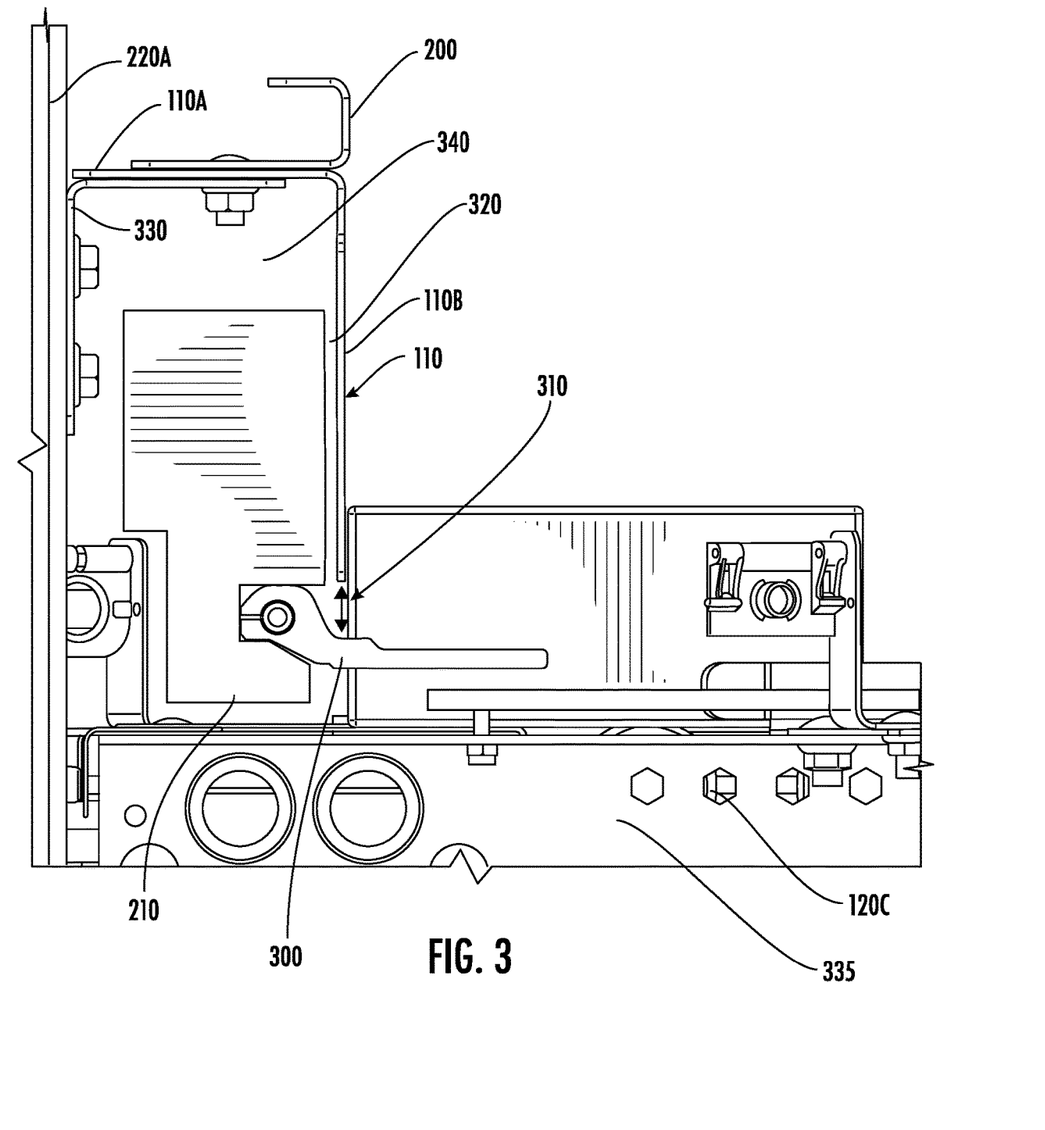
FIG. 3 illustrates a side view of a tunnel formed at least partially by the object stop in accordance with an example embodiment of the present disclosure.

FIG. 3 illustrates a side view of the arm tunnel on an object conveying system 100 in accordance with an example embodiment. As shown, the arm tunnel may define an interior portion surrounding a travel path for an extendable arm (discussed herein), and may be bounded at least partially by a surface of the conveyor (or conveyor frame), the object stop 110, and/or one or more frame posts (e.g., frame posts 220A, 220B). As discussed in reference to FIGS. 4A-4D, the object stop 110 of the illustrated embodiments defines a portion of the arm tunnel, and specifically defines a receiving portion 230 and one or more finger aperture portions 400 along the object stopping portion 110B. The receiving portion 230 has a height measured between the front edge of the attachment portion 110A and a bottom edge of the receiving portion 230 defining the overall height of the object stopping portion 110B. The finger aperture portions 400 define one or more finger apertures configured to allow a finger of an extendable arm mechanism 210 (discussed herein) to extend and retract (e.g., when retracting to the retracted position, the finger 300 may be rotated upward (about a pivot axis located proximate a bottom edge of the extendable arm mechanism 210), in the direction of the arm mechanism 210). For example, the finger(s) 300 may be configured to rotate between a retracted configuration in which the at least one finger is at least partially aligned with the extendable arm mechanism 210 such that the at least one finger is aligned for travel within the interior of the arm tunnel 340 and an extended configuration in which the at least one finger extends from the extendable arm mechanism and beyond the object stopping portion 110B to engage an object 115 engaged with the object stopping portion. In various embodiments, the finger aperture portions have a height measured between the front edge of the attachment portion 110A and a bottom edge of the included finger aperture that is less than the overall height of the object stopping portion 110B. The finger aperture is thereby formed between the bottom edge of the included finger aperture and the top surface of the conveyor frame. In various embodiments, the height of the finger apertures is greater than a length of the finger. As shown more fully in FIGS. 4A-4D, the receiving portion 230 may also a encompass a small planar surface 425 above at least one of the at least one finger aperture 400. In various embodiments, the object stop 110 may be used in conjunction with the cross bar 200, as shown, or in place of the cross bar 200. For example, the object stop 110 and the cross bar 200 may provide additional strength for stopping heavy objects during operation.

In some embodiments, the object stop 110 may define an attachment portion 110A and an object stopping portion 110B extending at least substantially perpendicularly from a front edge of the attachment portion 110A. In some embodiments, the width of the attachment portion 110A, measured between the front edge of the attachment portion 110A and an opposite back edge of the attachment portion 110A enables the attachment portion 110A to be secured (e.g., via fasteners extending through corresponding through holes of the attachment portion 110A) to the cross bar mounting 330 (e.g., by extending fasteners, such as bolts, threaded screws, and/or the like through through-holes of the attachment portion 110A and corresponding through-holes of the cross bar mounting 330). In certain embodiments, the attachment portion 110A and/or the cross bar mounting 330 may incorporate installation grooves enabling adjustment of the positioning of the object stop 110 relative to the cross bar mounting 330 (and by extension, enabling adjustment of the position of the object stop 110 relative to a movement path of the arm mechanism 210 so as to adjust gap 320) so as to provide the desired object stop gap 320 between the object stopping portion 110B of the object stop 110 and the arm mechanism 210. In various embodiments, the object stop gap 320 may be greater than zero, such as to allow the arm mechanism 210 to adjust based on the size of an object. In various embodiments, the size of the object stop gap 320 may be more than one inch. In some embodiments, as shown the attachment portion 110A may be attached to the mounting 330 via the same fastener as the cross bar 200. In some embodiments, the object stopping portion 110B may define a front surface configured to engage an object 115 in an instance in which the object 115 has reached the end of the conveyor 120C. An opposite back surface may define an interior surface of the described arm tunnel 340 in which the arm mechanism 210 travels. In some embodiments, the height of the object stopping portion 110B may be based on the position of the cross bar mounting 330 in relation to a top surface of the conveyor frame 335. In various embodiments, the object stopping portion 110B may define a height less than the distance between the cross bar mounting 330 and the top surface of the conveyor frame 335, so as to define a bottom gap between a bottom edge of the object stopping portion 110B and a top surface of the conveyor frame 335. The bottom gap may be sized such that, when the finger 300 is in an extended configuration, a top edge of the finger 300 passes below the bottom edge of the object stopping portion 110B during movement of the arm mechanism 210, and defining a finger mechanism gap 310 between the object stop 110 and the finger 300, such that the finger mechanism may travel laterally (e.g., along the second direction) underneath the object stop 110. In various embodiments, the object stop may engage any object 115 that defines a height greater than the bottom gap, measured between the bottom edge of the object stopping portion 110B of the object stop 110 and the top surface of the conveyor frame 335.

As shown in FIG. 3, in some embodiments the arm mechanism 210 may extend from a housing. In various embodiments, the arm mechanism 210 defines a base end at the housing and an opposite distal end. In some embodiments, the position of the arm may be indexed, such that the object conveying system 100 may recognize the location of the finger 300 (and the arm in general) relative to the object stop 110 and finger apertures 400. In some embodiments, a sensor, such as a light sensor, a position sensor, or the like, may be provided to recognize an instance in which the finger 300 is aligned with a finger aperture 400 and/or an instance in which an object is present to be engaged with by the finger). The fingers 300 may be rotationally secured to a bottom edge of the arm 210, within a first surface of the arm, proximate the distal end. In various embodiments, the fingers 300 may be configured to rotate between a closed configuration and an open/extended configuration. The fingers have a height (e.g., less than a thickness of the arm itself), a length (e.g., less than the height of the arm), and a thickness sufficient to avoid substantial deflection (e.g., the finger may be made out of 5/16 inch steel). In some embodiments, the length of the finger(s) 300 may be less than the height of the arm (e.g., the finger may be 107 millimeters in an instance in which the height of the arm mechanism 210 is 124.5 millimeters). In an example embodiment, the finger may be substantially longer then the height and/or thickness of the finger. For example, the finger 300 may comprise 5/16 inch (7.9375 millimeters) thick steel in an instance in which the length of the finger is 107 millimeters. In some embodiments, the arm mechanism 210 may have a substantially greater height than width. For example, the height of the arm mechanism 210 may be 124.5 millimeters in an instance in which the width is 54.14 millimeters. Various embodiments may have different dimensions based on the use case. In an instance in which a finger is in the closed configuration, a bottom edge of the finger is at least substantially aligned with a surface of the arm, and in an instance in which a finger is in the open configuration, the bottom edge of the finger is positioned above the bottom edge of the arm and over the horizonal surface of the conveyor. In various embodiments, the top edge of the finger defines a top edge height that is the height of the bottom edge of the finger.

The arm mechanism 210 may define one or more retractable fingers 300 (e.g., shown in the extended position in FIG. 3). In various embodiments, one or more retractable fingers 300 may be rotationally attached at a bottom edge of the arm. In various embodiments, the object conveying system may define an arm tunnel 340 between the frame posts 220A and the object stop 110. In some embodiments, the tunnel 340 may be defined by the object stopping portion 110B of the object stop 110 on a first side, the attachment portion 110A of the object stop 110 on a second side, the frame posts 220A, 220B on a third side, and the conveyor 120C (e.g., a top surface of the conveyor frame) on a fourth side. In various embodiments, the tunnel 340 may be sized to allow the arm mechanism 210 to travel along a travel path within the interior of the tunnel without interference (e.g., without contacting any sides/boundaries of the arm tunnel). For example, the tunnel 340 may be both wider and taller than the arm mechanism 210. In various embodiments, the object stop 110 may have an object stopping portion 110B defining at least a first side of the arm tunnel 340. In various embodiments, the object stopping portion 110B may be at least substantially parallel with the second direction and the objection stopping portion 110B may be configured to engage the object 115 moving in the first direction.

In some embodiments, an object stop gap 320 may be defined between the object stop 110 and the arm mechanism 210. For example, the object stop gap 320 may be defined to allow for the object stop 110 to slightly deflect with minimal or no contact with the arm mechanism 210 in an instance in which an object makes contact with the object stop 110. In some embodiments, the arm mechanism 210 may define one or more finger mechanisms 300 configured to engage with an object 115 in order to move the object 115 generally in the second direction discussed herein (e.g., to another conveyor or a container).

Figure 4A:
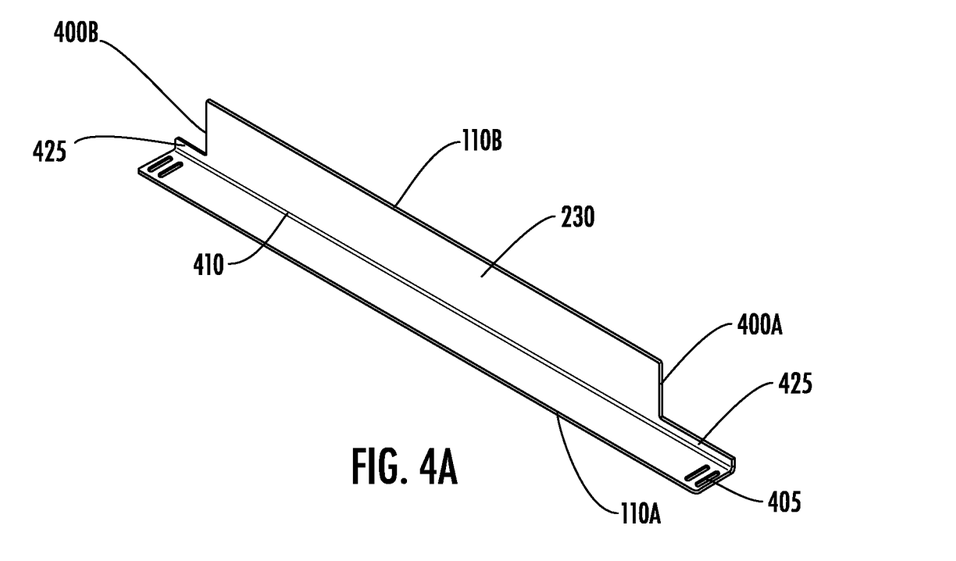
FIGS. 4A-4D illustrate various object stop configurations in accordance with an example embodiment of the present disclosure.
Figure 4B:
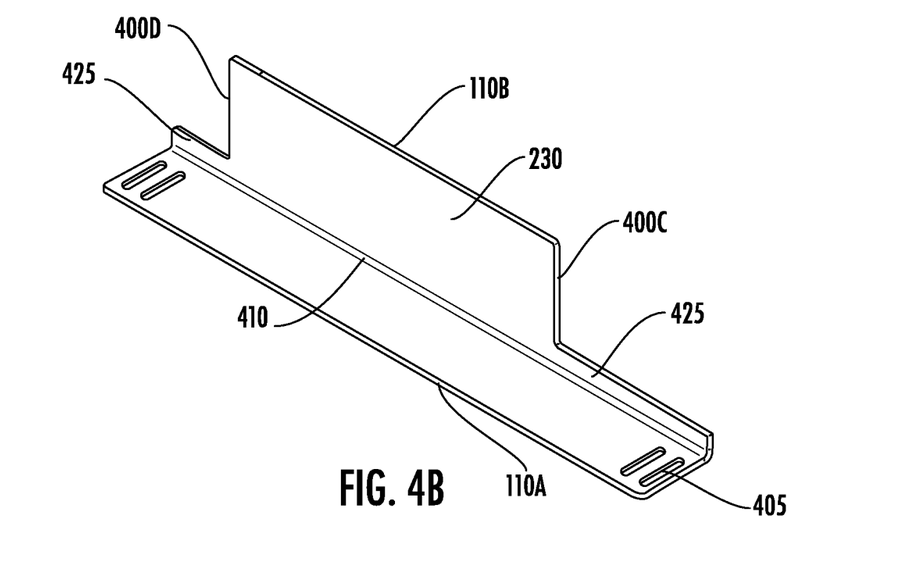

FIGS. 4A-4D illustrate various different object stop 110 configurations in accordance with example embodiments of the present disclosure. In various embodiments, as discussed below, the object stop 110 may be laser cut from a sheet of material (e.g., metal) and then bent along the line 410, such as via a press brake and/or other bending mechanisms. FIGS. 4A and 4B illustrate object stops 110 configured with finger apertures (e.g., finger apertures 400A and 400B for FIG. 4A and finger apertures 400C and 400D for FIG. 4B) on opposing ends of the object stopping portion 110B. For example, during operation, the finger mechanism 300 may be capable of rotating between closed and extended positions while aligned with the finger apertures at either end of the object stop 110. In various embodiments, the height of the finger apertures (e.g., finger apertures 400A and 400B for FIG. 4A and finger apertures 400C and 400D for FIG. 4B) defined between a bottom edge of the finger aperture and the top surface of the conveyor frame may be greater than the combination of the length of the finger and the distance between the bottom edge of the arm mechanism and the top surface of the conveyor frame. Additionally, the bottom edge of the finger aperture need not be aligned with the front edge of the attachment portion 110A, though it may be in some embodiments. As shown, a small planar surface 425 may be defined between the finger aperture and the front edge of the attachment portion 110A. In such embodiments, the small planar surface 425 may provide increased protection of the arm from various objects.

In various embodiments, the number of finger apertures 400 may be based on the width of the frame (e.g., distance between frame 220A and 220B) and the width of the conveyor 120C. In configurations in which the width of the conveyor is less than the distance between the frame 220A, 220B, a plurality of finger apertures 400 may be implemented. For example, as shown in FIGS. 4A and 4B, a finger aperture may be disposed on opposing edges of the object stopping portion 110B (e.g., finger apertures 400A and 400B of FIG. 4A and finger apertures 400C and 400D of FIG. 4B). In various embodiments, in which the width of the conveyor is greater than the distance between the frame 220A, 220B, a single finger aperture 400 may be implemented. In some embodiments, the finger apertures 400 may be provided such that the receiving portion 230 defines a width of at least the width of the conveyor 120C, such that an object at any lateral position of the conveyor may still engage with the object stop 110.

In various embodiments, the size of the finger apertures may be based on the size of various objects 115 and/or the size of the finger mechanisms 300. For example, the width of the aperture along the bottom of the object stopping portion 110B may be less than the width of a potential object 115, such that an object 115 travelling along the conveyor may engage with the object stopping portion 110B. Moreover, the width of the aperture is greater than a width of the finger 300, thereby enabling the finger to rotate freely between the closed and extended configurations when aligned with the aperture. Additionally, the height of the finger aperture may be based on the length of the finger mechanism 300, such that the finger may pass within the finger aperture in an instance in which the finger mechanism 300 may be retracted or extended.

Figure 4C:
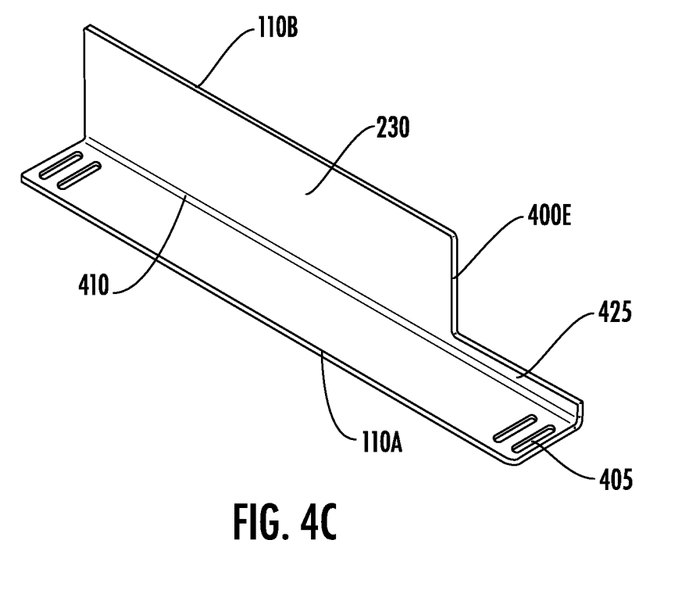
Figure 4D:
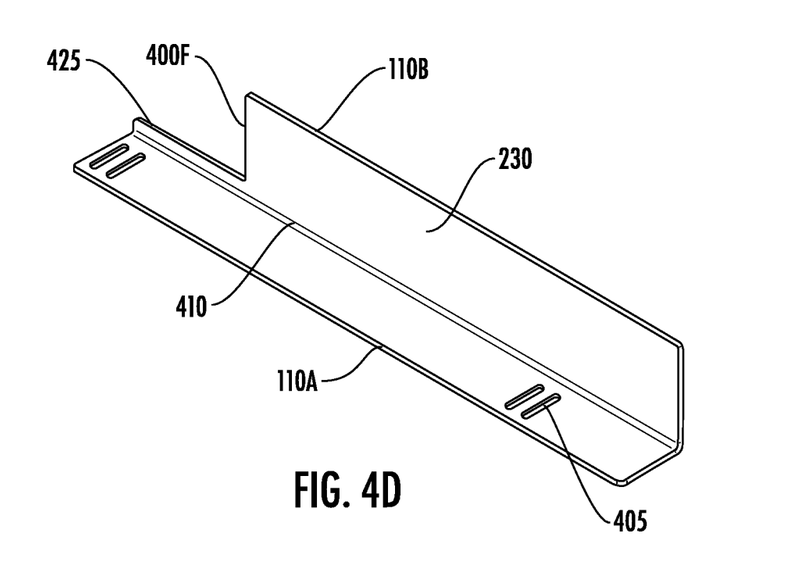

In some embodiments, the object stop 110 may define a singular finger aperture (e.g., finger aperture 400E for FIG. 4C and finger aperture 400F for FIG. 4D) along one side of the object stopping portion 110B of the object stop 110. In some embodiments, the object stop 110 may be installed such that the finger mechanism 300 may travel laterally beyond the object stop 110, such that the finger mechanism 300 may rotate between a closed configuration and an extended configuration without being restricted by the object stop 110. In various embodiments, as shown in FIGS. 4C and 4D, the finger aperture (e.g., apertures 400E and 400F) may be at either side of the object stopping portion 110B depending on the usage of the object stop 110. In some embodiments, additional finger apertures may be disposed along the object stopping portion 110B of the object stop 110 at locations other than the edge. For example, the object stop 110 may define a finger aperture 400 in the middle of the object stopping portion 110B either in addition to or in place of one or more other finger apertures along the edge.

In various embodiments, the object stop 110 may define one or more attachment apertures 405 configured to allow for the coupling of the attachment portion 110A of the object stop 110 to the cross bar mounting 330 and/or the cross bar 200. In various embodiments, the position of the attachment apertures 405 may be based on the design of the object conveying system 100. For example, the attachment apertures may be located in such a position to allow for attachment to a mounting (e.g., the cross bar mounting 330).

In some embodiments, the width of the attachment portion 110A, measured between the front edge of the attachment portion 110A and an opposite back edge of the attachment portion 110A enables the attachment portion 110A to be secured (e.g., via fasteners extending through corresponding through holes of the attachment portion 110A) to the cross bar mounting 330 (e.g., by extending fasteners, such as bolts, threaded screws, and/or the like through through-holes of the attachment portion 110A and corresponding through-holes of the cross bar mounting 330). In certain embodiments, the attachment portion 110A and/or the cross bar mounting 330 may incorporate installation grooves enabling adjustment of the positioning of the object stop 110 relative to the cross bar mounting 330 (and by extension, enabling adjustment of the position of the object stop 110 relative to a movement path of the arm mechanism 210 so as to adjust gap 320) so as to provide the desired object stop gap 320 between the object stopping portion 110B of the object stop 110 and the arm mechanism 210. In some embodiments, as shown the attachment portion 110A may be attached to the mounting 330 via the same fastener as the cross bar 200.

Figure 5:
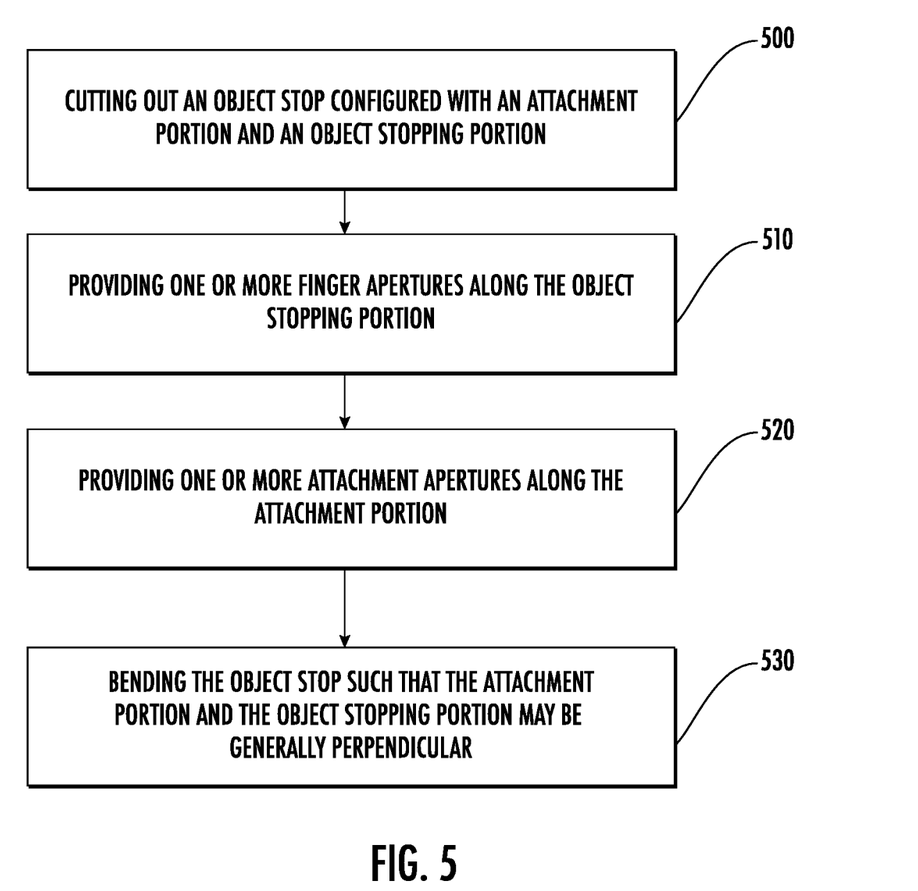
FIG. 5 is a flow chart illustrating the method of manufacturing the object stop in accordance with an example embodiment of the present disclosure.

FIG. 5 is a flowchart illustrating the steps of manufacturing an object stop 110 in accordance with an example embodiment. Referring now to Block 500 of FIG. 5, the method may include cutting out an object stop configured with an attachment portion and an object stopping portion. In various embodiments, the object stop 110 may be cut out via a laser cutter, a stamp machine, a water jet cutter, and/or various other cutting methods. In various embodiments, the object stop 110 may be cut from a singular piece of material. For example, the object stop 110 may be cut from a single sheet of metal. In various embodiments, the object stop 110 may comprise a plurality of pieces welded, bolted, riveted, bonded, and/or the like, together to form the object stop 110. For example, the object stop 110 may define an attachment portion 110A that is separate form the object stopping portion 110B, such that the attachment portion 110A and the object stopping portion 110B are attached to one another (e.g., approximately perpendicular to one another).

Referring now to Block 510 of FIG. 5, the method also includes providing one or more finger apertures along the object stopping portion of the object stop. In some embodiments, the finger apertures may be created during the cutting process of Block 500. For example, the object stop 110 may be cut from a single sheet of metal with the finger apertures already provided. In some embodiments, the finger aperture (s) may be cut subsequent to the initial cutting of the object stop 110. For example, the first cut may cut a generally square shape defining both the attachment portion 110A and the object stopping portion 110B before the finger apertures are provided. As discussed above, the size of the finger aperture may be based on the size of the finger mechanisms 300 and/or the size of objects 115 expected to be carried by the conveying system. In some embodiments, the height of the finger aperture may be less than the height of the object stopping portion 110B of the object stop 110, such a portion of the object stopping portion 110B remains above each finger aperture. In other embodiments, the finger aperture may have a height at least substantially equal to the height of the object stopping portion 110B, such that a bottom edge of the object stopping portion is at least substantially aligned with a front edge of the attachment portion 110A (and a bottom surface of the attachment portion 110A).

Referring now to Block 520 of FIG. 5, the method may include providing one or more attachment apertures along the attachment portion of the object stop. As discussed in reference to Block 510 above, the attachment apertures may also be cut during the cutting step discussed in Block 500. In some embodiments, the attachment apertures may be provided subsequent to the initial cutting process of Block 500. The attachment apertures 405 may be provided at various positions along the attachment portion 110A, based on the attachment locations of a given object conveying system 100. For example, the attachment apertures may have the same amount of spacing as the attachment holes of the cross bar 200, such that the object stop 110 may be secured via the cross bar mountings (e.g., mounting 330) discussed herein. As shown, in some embodiments, multiple attachment apertures may be provided proximate to another to provide additional strength to the object stop 110.

Referring now to Block 530 of FIG. 5, the method may include bending the object stop such that the attachment portion 110A and the object stopping portion 110B may be at least substantially perpendicular to one another. In some embodiments, the object stop 110 may be bent using a press brake and/or other bending methods. In some embodiments, the object stop 110 may be bent along the line 410 shown in FIGS. 4A-4D configured to delineate the attachment portion 110A and the object stopping portion 110B of the object stop 110. In some embodiments, the bending process of Block 530 may occur subsequent to the steps of Block 500 through 520.

Figure 6:
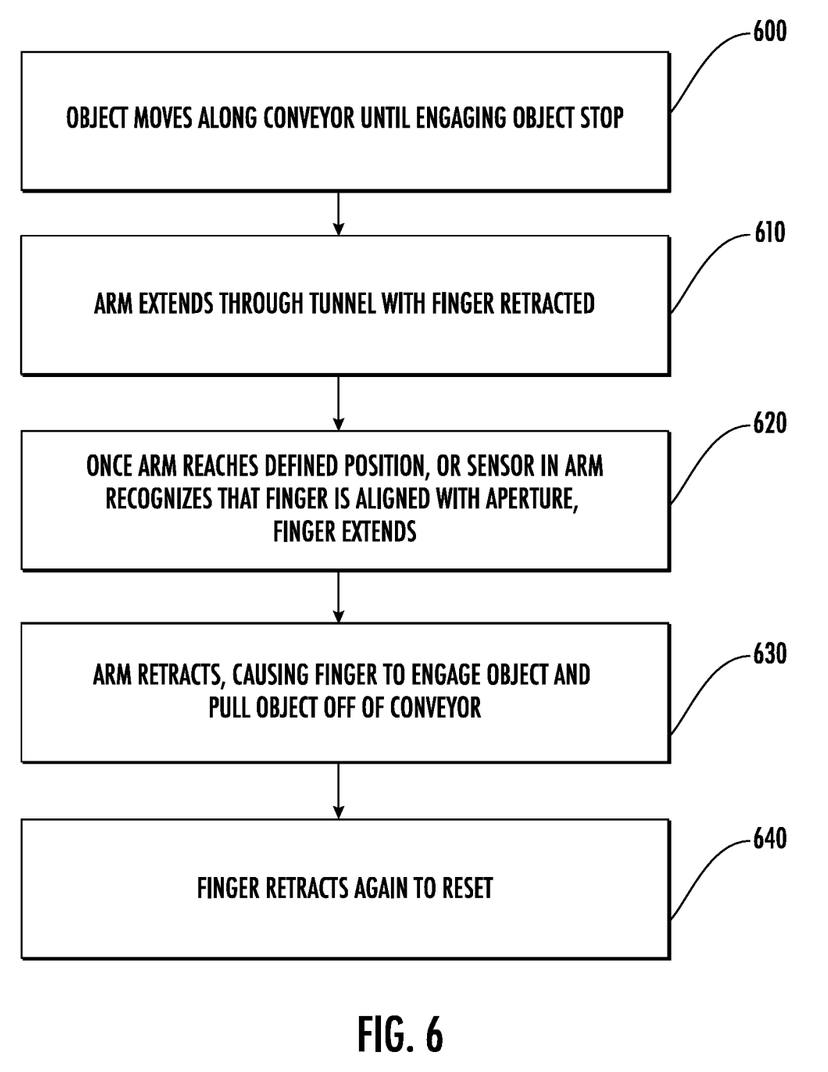
FIG. 6 is a flow chart illustrating the method of operation of an automated object conveyor system in accordance with an example embodiment of the present disclosure.

FIG. 6 is a flowchart illustrating a method of operation for an object redirection mechanism in accordance with an example embodiment. Referring now to Block 600 of FIG. 6, the method may include an object 115 moving along conveyor 120A-120C in the first direction until engaging object stop 110. As discussed above, the object 115 may travel along the conveyor 120A-120C in a first direction until reaching the object stop 110. In various embodiments, the object 115 may engage with the receiving portion 230 of the object stopping portion 110B of the object stop 110. As such the motion of the object 115 in the first direction may be stopped based on the engagement with the object stop 110.

Referring now to Block 610 of FIG. 6, the method may include extending the arm 210 along an extendable arm travel path through the arm tunnel 340 (e.g., at least substantially parallel with al length of the arm tunnel) with the fingers 300 retracted. In various embodiments, the arm mechanism 210 may be travelling in the second direction along at least a portion of the length of the arm tunnel 340 within the tunnel 340 until the arm mechanism 210 reaches the intended finger deployment position. Referring now to Block 620 of FIG. 6, the method may include extending the finger (e.g., rotating the fingers 300 from the retracted position within the tunnel through one of the finger apertures 400 into the extended position. In various embodiments, the deployment of the finger may be a result of the arm reaching a predefined location (e.g., the location of the finger apertures may be known). Additionally or alternatively, a sensor, such as a position sensor, a proximity sensor, or the like, may determine an instance in which a finger is lined up with a finger aperture to allow for the finger to be rotated into the extended position.

Referring now to Block 630 of FIG. 6, the method may include retracting the arm mechanism 210 along the tunnel 430, such that the finger(s) 300 engage with the object and guide the object in the second direction (e.g., off of the conveyor 120C into a container, another conveyor, or the like). In some embodiments, the finger(s) may rotate into the extended position before engaging with the object, such that one in the extended position, the arm moves until the finger engages with the object.

Referring now to Block 640 of FIG. 6, the method may include retracting (e.g., rotating) the fingers to reset the object redirection mechanism. For example, the finger 300 may rotate (e.g., through a finger aperture) back into the tunnel 340. As such, the operations discussed herein may be repeated with additional objects of various sizes. In some instances, the finger may be extended and retracted through the same finger apertures. Alternatively, the finger may be extended and retracted through different finger apertures. In some embodiments, the finger may be retracted outside of the width of the object stop 110. For example, the arm mechanism 210 may extend in the second direction beyond the object stop 110, such that the finger may be rotated into the retracted and/or extended position without interference with the object stop 110.

It must be noted that, as used in this specification and the appended claims, the singular forms "a," "an," and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments, but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present disclosure are disclosed herein; however, it is to be understood that the disclosed embodiments are merely exemplary, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While it is apparent that the illustrative embodiments herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. An object redirection mechanism for a conveying system, wherein the object redirection mechanism is configured to redirect an object moved by the conveying system from a first direction to a second direction, and wherein the object redirection mechanism comprises:
    an extendable arm mechanism, wherein the extendable arm mechanism is operably coupled with one or more fingers, and wherein the one or more fingers are configured to engage and provide a moving force on the object;
    an arm tunnel positioned proximate an end of a conveyor configured for moving an object in the first direction, wherein an interior of the arm tunnel defines a protected linear travel path parallel to the second direction for the extendable arm mechanism to separate the extendable arm mechanism from objects moving in the first direction, and wherein the arm tunnel comprises:
        an object stop having an object stopping portion defining at least a first side of the arm tunnel at least substantially parallel with the second direction and configured to engage an object moving in the first direction, and wherein the object stopping portion defines at least one finger aperture to enable at least one of the one or more fingers to, when aligned with the at least one finger aperture, rotate between:
            a retracted configuration in which at least one finger of the one or more fingers is at least partially aligned with the extendable arm mechanism such that the at least one finger is aligned for travel within the interior of the arm tunnel; and
            an extended configuration in which the at least one finger extends from the extendable arm mechanism and beyond the object stopping portion to engage an object engaged with the object stopping portion; and
        wherein a bottom edge of the object stopping portion is spaced above a top surface of the conveyor to enable the at least one finger to pass under the bottom edge of the object stopping portion when in the extended configuration to engage an object and move the object in the second direction.

2. The object redirection mechanism of claim 1, wherein the object stopping portion defines a receiving portion, wherein the receiving portion defines a planar surface along the first side of the arm tunnel, and wherein the receiving portion is configured to engage with one or more objects travelling in the first direction.

3. The object redirection mechanism of claim 2, wherein the receiving portion further comprises a planar surface above at least one of the at least one finger aperture.

4. The object redirection mechanism of claim 1, wherein the object stopping portion defines two finger apertures defined on opposite edges of the object stopping portion.

5. The object redirection mechanism of claim 1, wherein the object stop further comprises an attachment portion, wherein the attachment portion is configured to attach the object stop to the conveying system.

6. The object redirection mechanism of claim 5, wherein the object stopping portion and the attachment portion are formed via a bending process.

7. The object redirection mechanism of claim 5, wherein the attachment portion defines one or more attachment apertures configured to attach the object stop to the conveying system.

8. The object redirection mechanism of claim 1, wherein the at least one finger is rotationally attached at a bottom edge of the extendable arm mechanism.

9. The object redirection mechanism of claim 1, wherein a height of the at least one finger aperture is greater than a length of the at least one finger.

10. An object conveying system with object stop, the object conveying system comprising:
    a conveyor for moving an object in a first direction;
    an extendable arm mechanism configured to move along with an object in a second direction during operations;
    one or more fingers operably coupled with the extendable arm mechanism, such that the one or more fingers are controlled via the extendable arm mechanism, wherein the one or more fingers are configured to engage and provide a moving force on the object; and
    an arm tunnel positioned proximate an end of a conveyor configured for moving an object in the first direction, wherein an interior of the arm tunnel defines a protected linear travel path parallel to the second direction for the extendable arm mechanism to separate the extendable arm mechanism from objects moving in the first direction, and wherein the arm tunnel comprises:
        an object stop having an object stopping portion defining at least a first side of the arm tunnel at least substantially parallel with the second direction and configured to engage an object moving in the first direction, and wherein the object stopping portion defines at least one finger aperture to enable at least one of the one or more fingers to, when aligned with the at least one finger aperture rotate between:
            a retracted configuration in which at least one finger of the one or more fingers is aligned with the extendable arm mechanism such that the at least one finger is aligned for travel within the interior of the arm tunnel; and
            an extended configuration in which the at least one finger extends from the extendable arm mechanism and beyond the object stopping portion to engage an object engaged with the object stopping portion; and
        wherein a bottom edge of the object stopping portion is spaced above a top surface of the conveyor to enable the at least one finger to pass under the bottom edge of the object stopping portion when in the extended configuration to engage an object and move the object in the second direction.

11. The object conveying system of claim 10, wherein the object stopping portion of the object stop defines a receiving portion, wherein the receiving portion defines a planar surface along the first side of the arm tunnel, and wherein the receiving portion is configured to engage with one or more objects travelling in the first direction.

12. The object conveying system of claim 11, wherein the receiving portion further comprises a planar surface above at least one of the at least one finger aperture.

13. The object conveying system of claim 10, wherein the object stopping portion defines two finger apertures defined on opposite edges of the object stopping portion.

14. The object redirection mechanism of claim 10, wherein the object stop further comprises an attachment portion, wherein the attachment portion is configured to attach the object stop to the object conveying system.

15. The object redirection mechanism of claim 14, wherein the object stopping portion and the attachment portion are formed via a bending process.

16. The object redirection mechanism of claim 14, wherein the attachment portion defines one or more attachment apertures configured to attach the object stop to the object conveying system.

17. The object redirection mechanism of claim 10, wherein the at least one finger is rotationally attached at a bottom edge of the extendable arm mechanism.

18. The object redirection mechanism of claim 10, wherein the at least one finger aperture has a height greater than a length of the at least one finger.

19. The object redirection mechanism of claim 10, further comprising a second conveyor, wherein the object redirection mechanism is configured to move the object onto the second conveyor.

20. The object redirection mechanism of claim 10, wherein the object redirection mechanism is configured to move the object into a container.

\* \* \* \* \*